United States Patent [19]

Stewart

[11] 3,806,718

[45] Apr. 23, 1974

[54] CALIBRATION CIRCUIT SUITABLE FOR CENTRIFUGAL TYPE CHEMICAL ANALYZER

[75] Inventor: Marvin C. Stewart, Hempstead, N.Y.

[73] Assignee: Union Carbide Corporation, New York, N.Y.

[22] Filed: May 31, 1972

[21] Appl. No.: 258,258

[52] U.S. Cl. .............................. 235/156, 235/150.3

[51] Int. Cl. .............................................. G06f 7/39

[58] Field of Search ............. 235/156, 150.3, 151.3, 235/92 EA, 154

[56] References Cited

UNITED STATES PATENTS

| | | | |
|---|---|---|---|
| 3,064,889 | 11/1962 | Hupp | 235/92 EA |
| 3,126,476 | 3/1964 | Pariser et al. | 235/150.3 X |
| 3,646,331 | 2/1972 | Lord | 235/151.3 |
| 3,610,898 | 10/1971 | Yamamoto et al. | 235/156 X |
| 2,910,237 | 10/1959 | Meyer et al. | 235/150.3 X |

*Primary Examiner*—Felix D. Gruber
*Assistant Examiner*—James F. Gottman
*Attorney, Agent, or Firm*—Fredrick J. McCarthy, Jr.

[57] ABSTRACT

A calibration circuit for providing a calibrated output signal for uncorrected binary data including a plurality of cascaded binary rate multiplier devices in combination with counting devices.

2 Claims, 11 Drawing Figures

$f = FA$ $A = SW5 + SW2 + SW1' + SW1$ $f = F(SW5 + SW2 + SW1' + SW1) = f_5 + f_2 + f_1' + f_1$

CALIBRATION CIRCUIT SUITABLE FOR CENTRIFUGAL TYPE CHEMICAL ANALYZER

The present invention is directed to a circuit for use in calibrating an electronic signal. More particularly, the present invention is directed to a circuit for providing a digital output signal which is a desired fraction or multiple of an analog input signal.

In various electronic measuring devices, an analog electrical signal is developed proportional to a particular parameter, e.g. temperature, light intensity etc., and this signal is converted to digital form and ultimately a numerical "readout". Often, the analog signal is "off" in value by a certain amount, due possibly to normal variations in the A.C. line power and the like, in which case it has been customary to adjust the analog signal, i.e. calibrate, through trial and error potentiometer variations and the like. This approach is time consuming and depends in some measure on the skill and training of the individual making the adjustments.

It is therefore an object of the present invention to provide a circuit which permits a digital signal corresponding to an analog input signal to be rapidly and simply calibrated.

Figure 1:
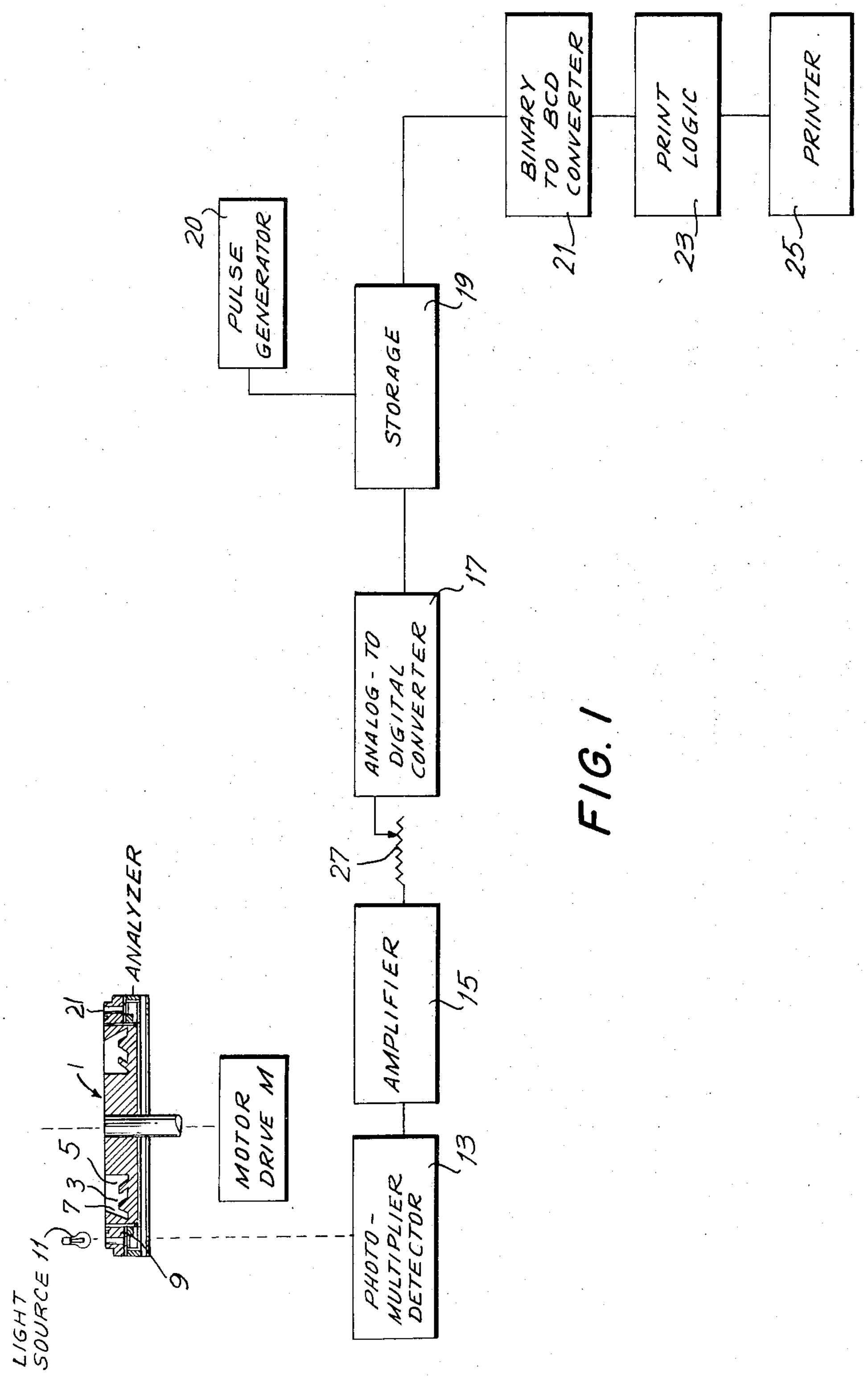
Figure 2:
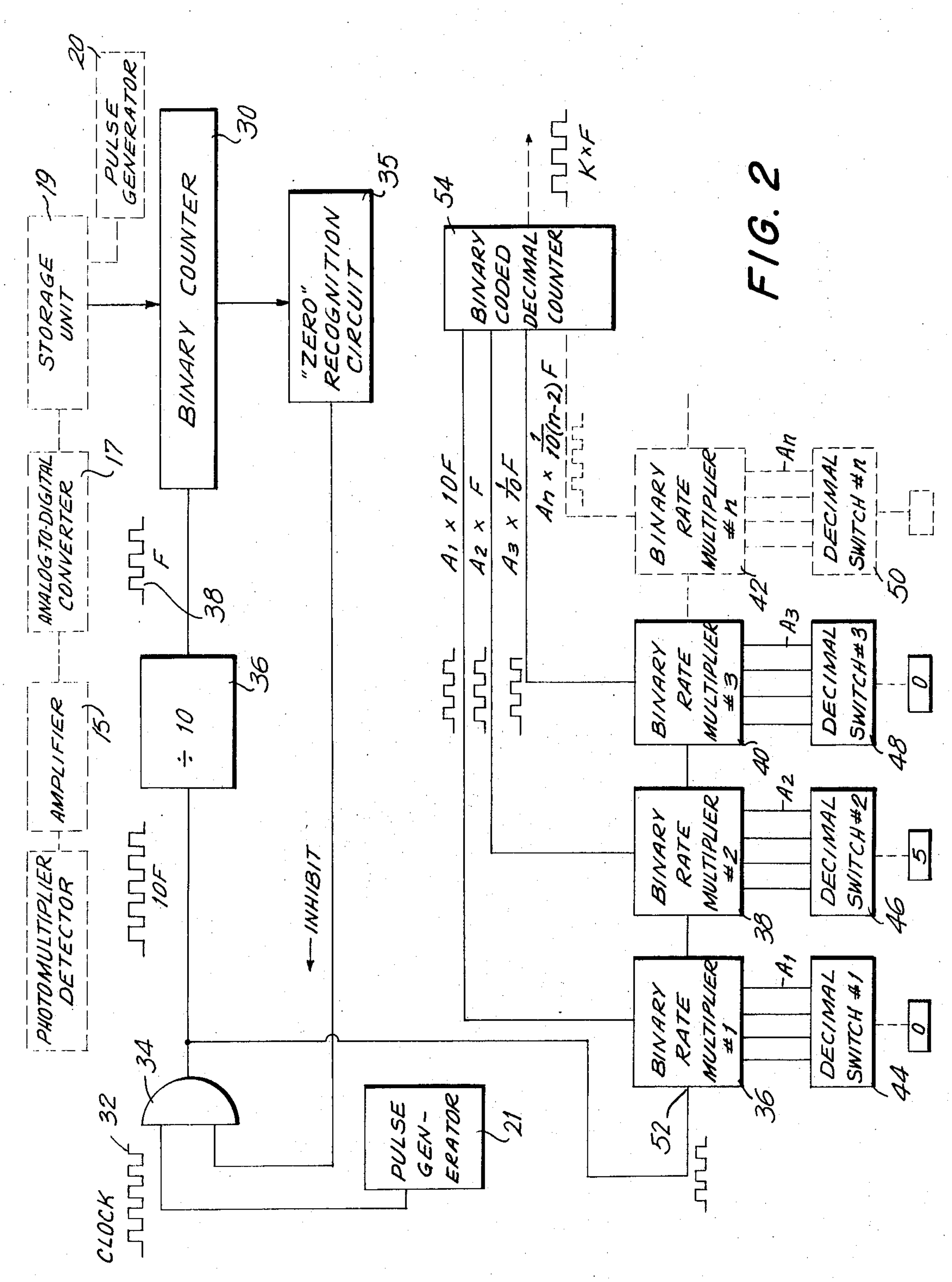
Figure 3:
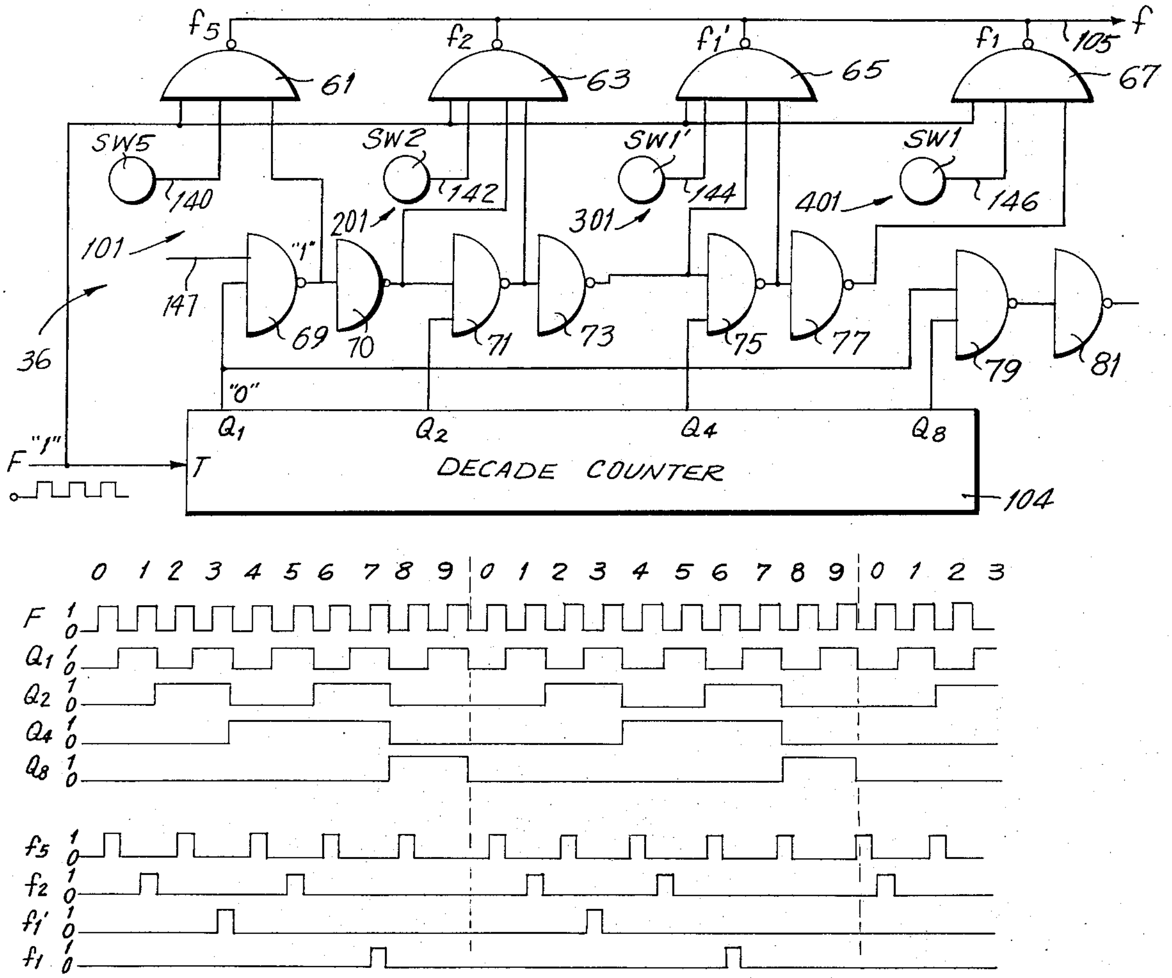
Figures 3A, 5:
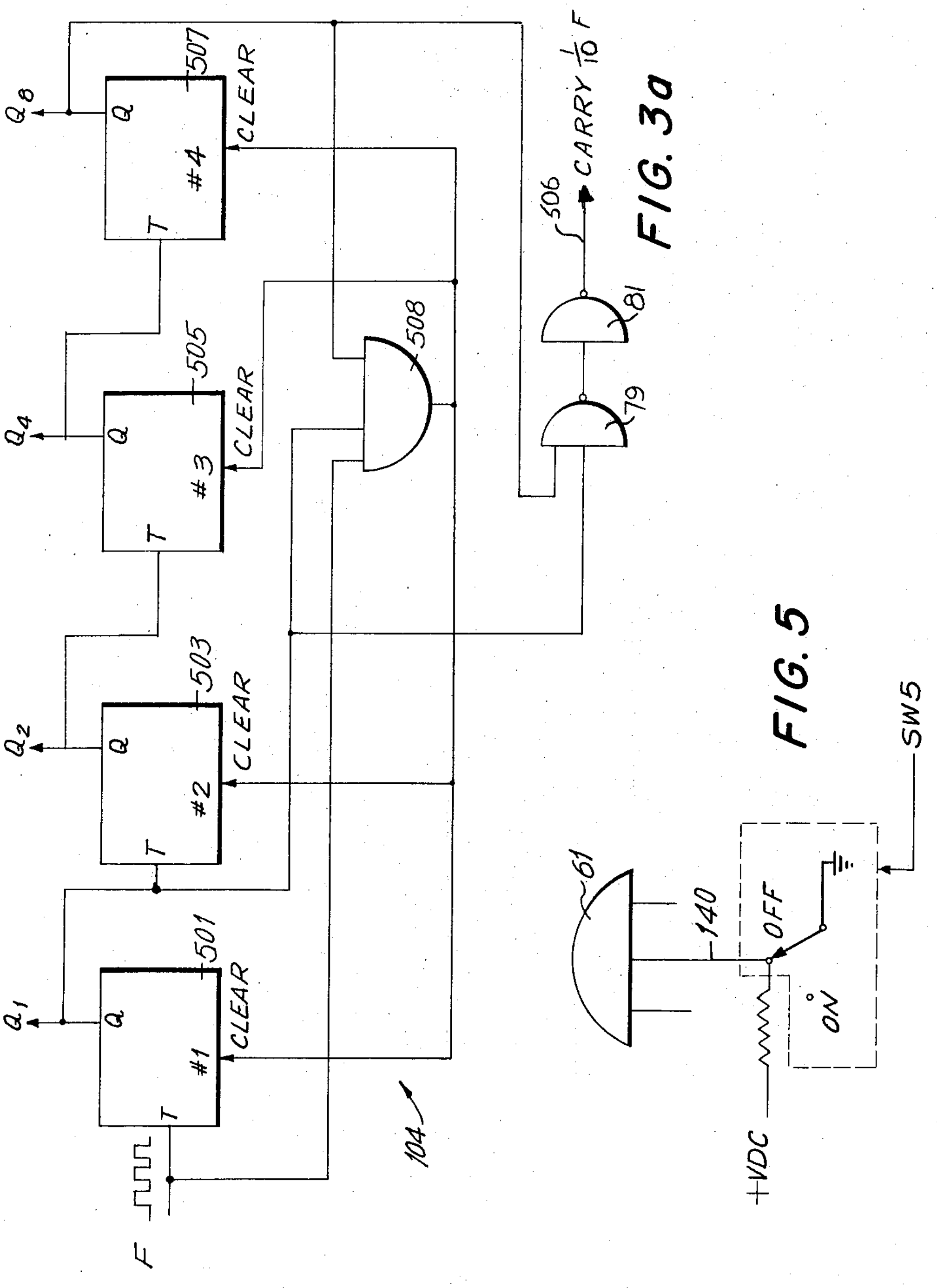
Figure 4A:
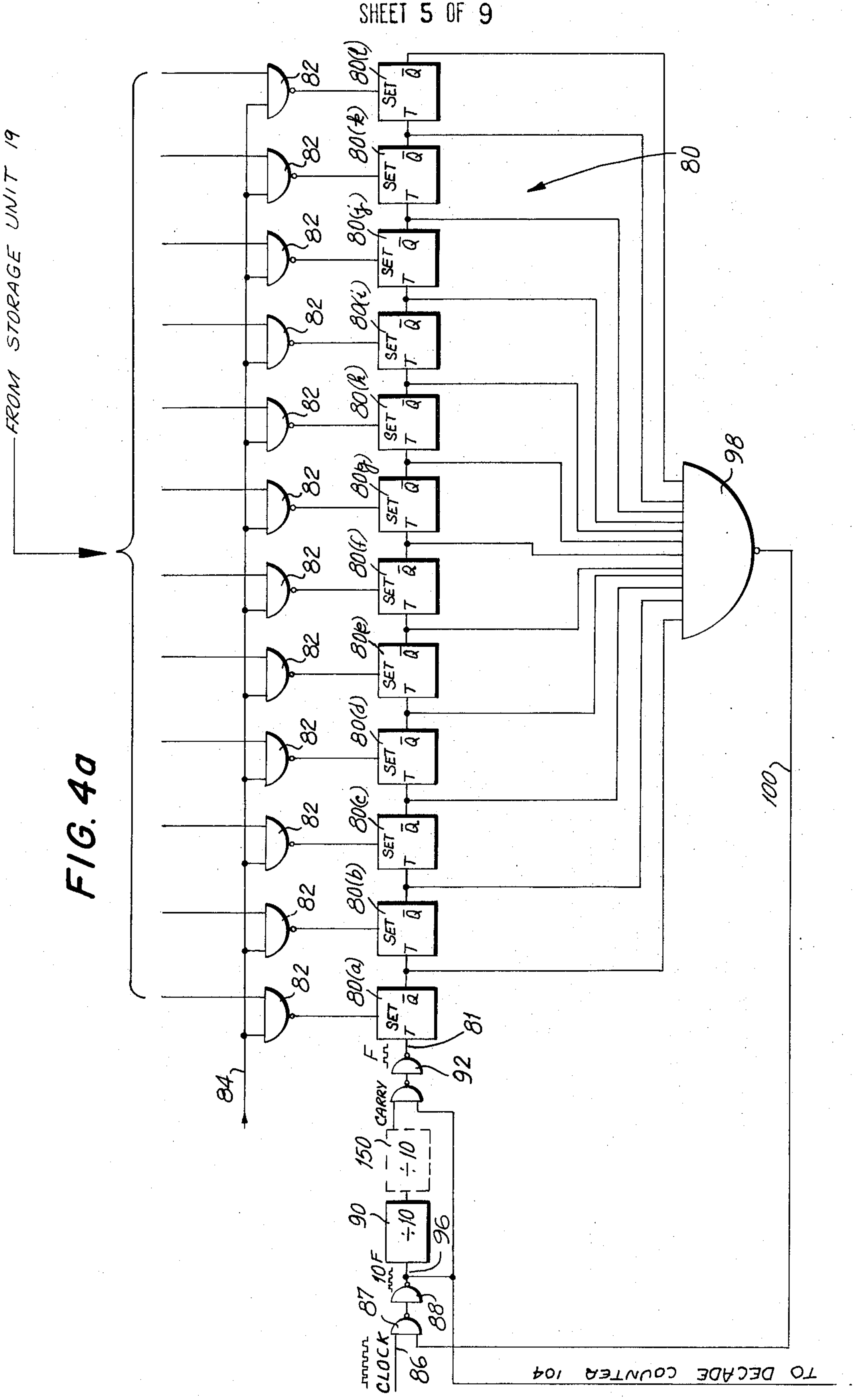
Figure 4B:
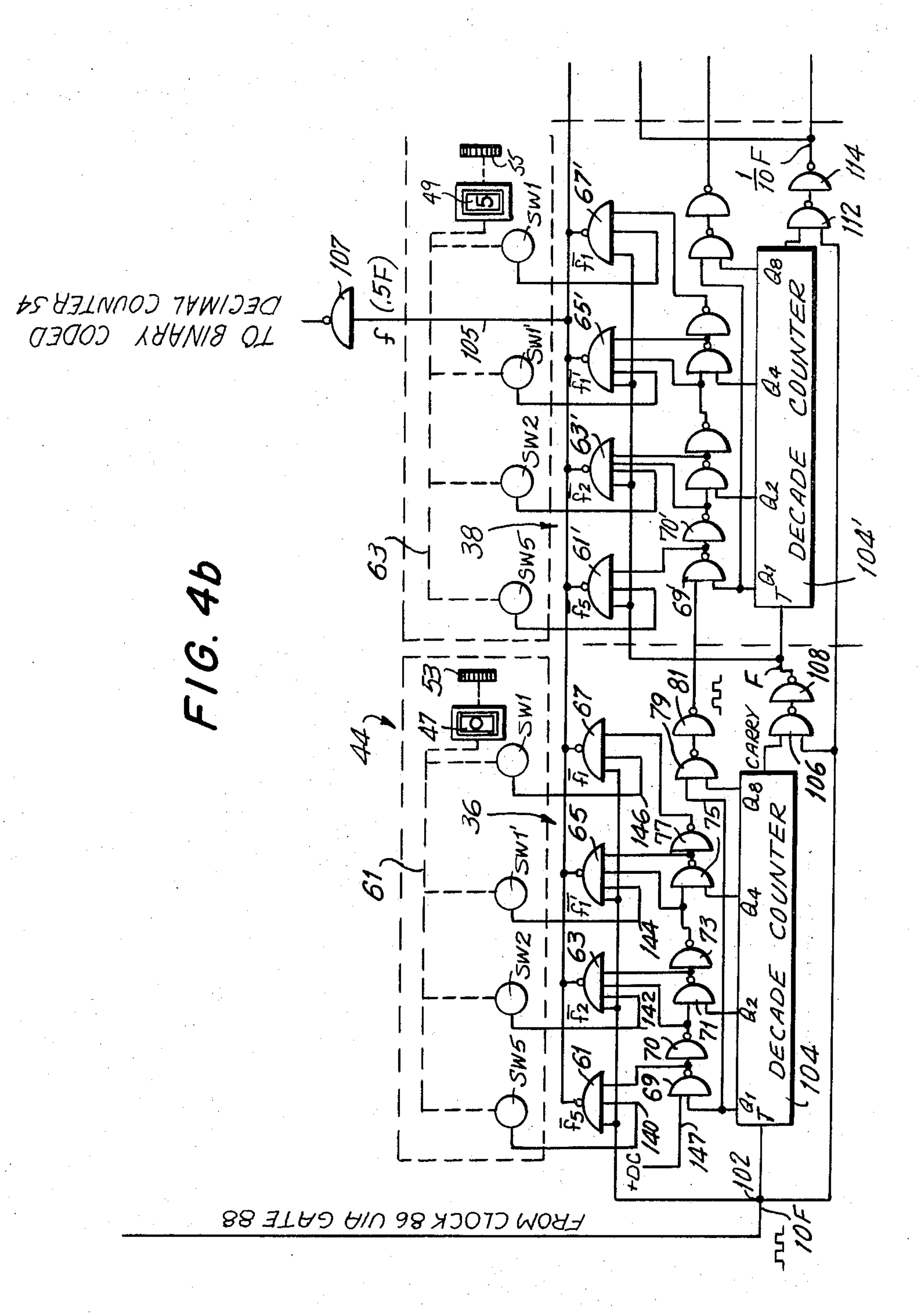
Figure 4C:
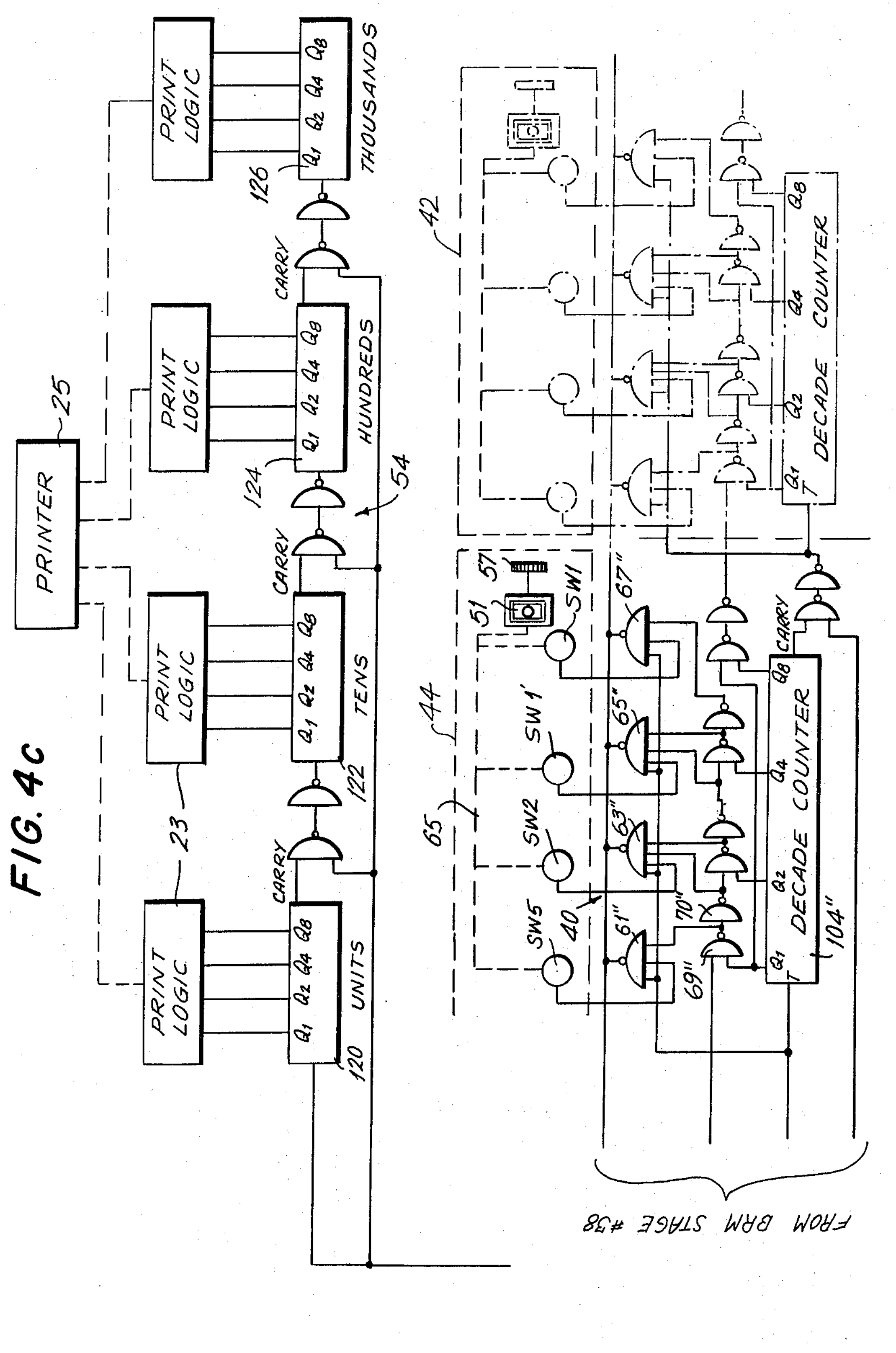
Figure 6A:
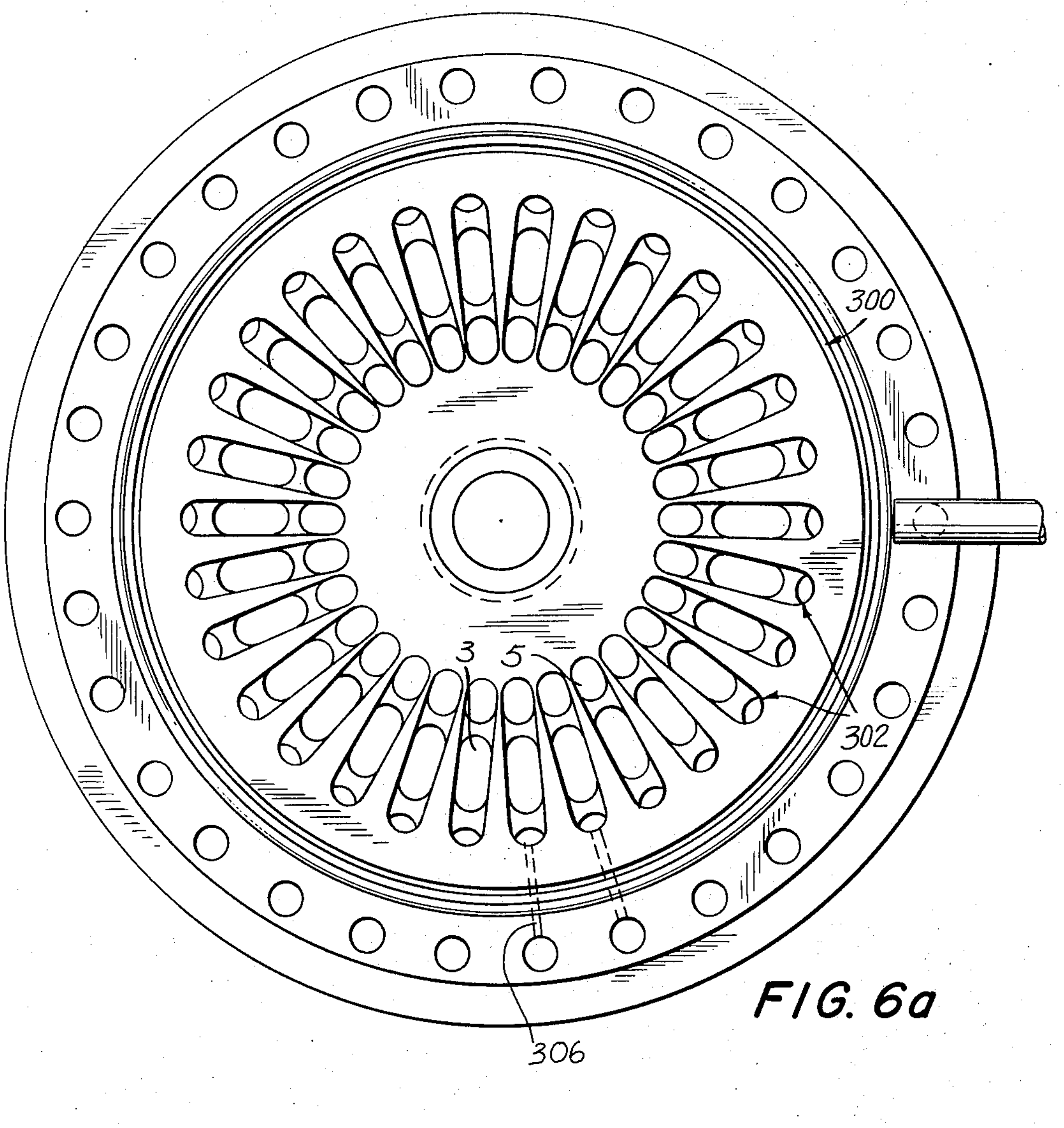
Figure 6:
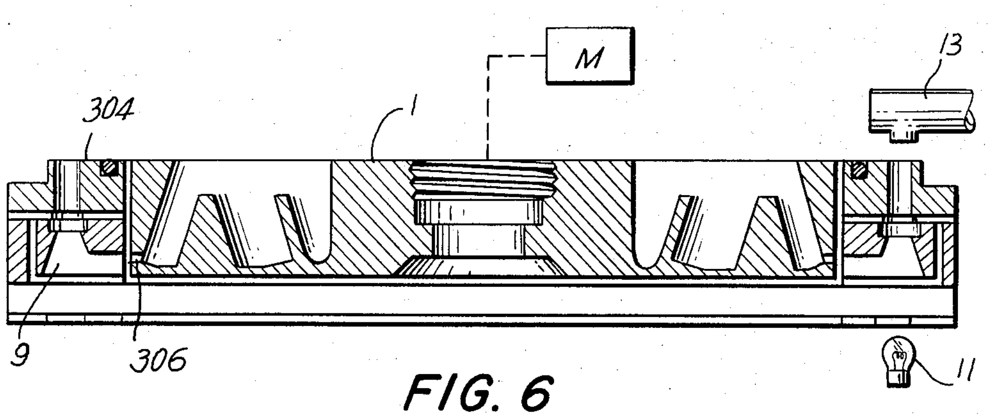
Figure 7:
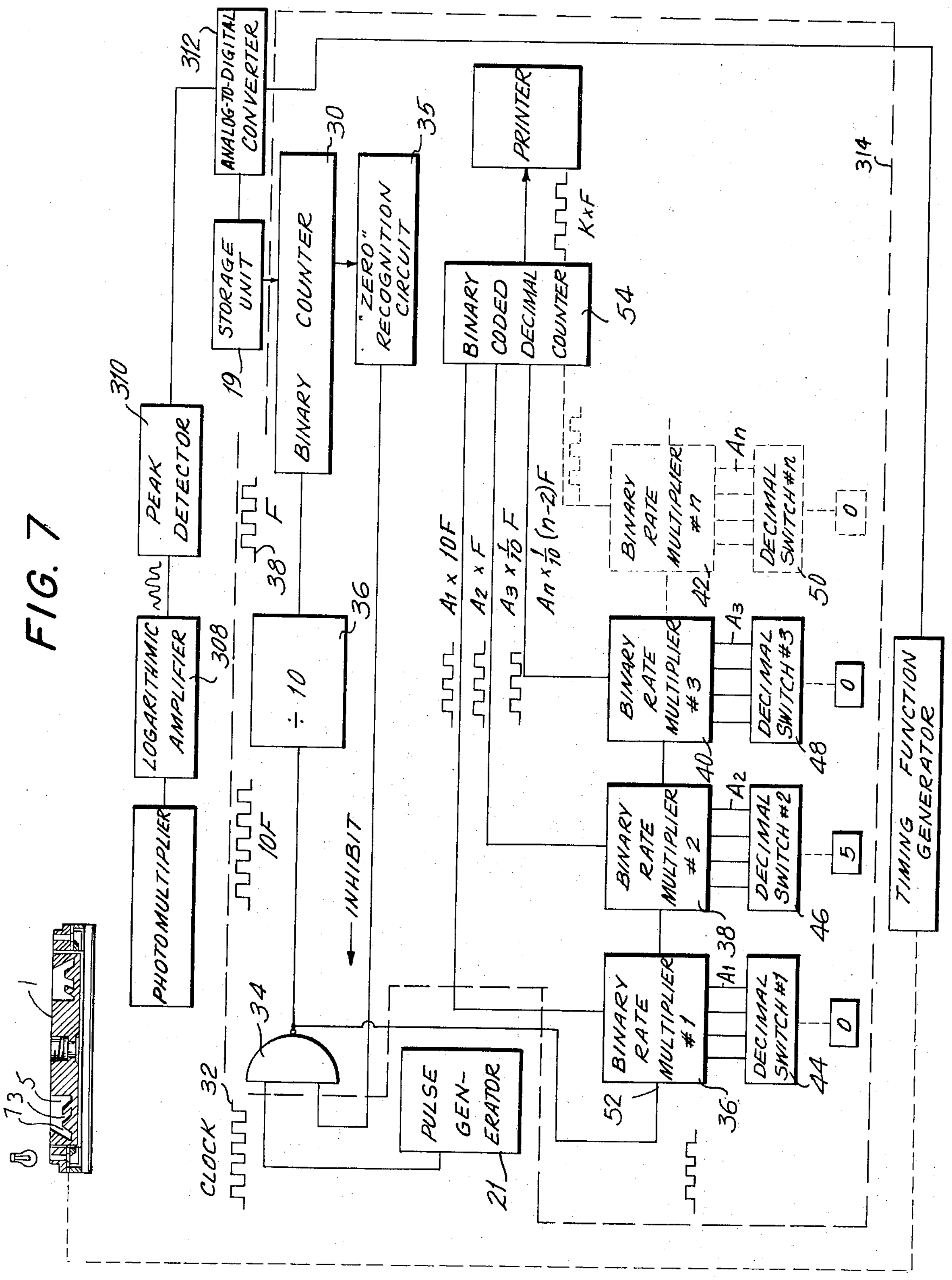

Other objects will be apparent from the following description and claims taken in conjunction with the drawing wherein FIG. 1 is a schematic representation of means for obtaining a numerical printout of data from a centrifugal type chemical analyzer FIG. 2 illustrates schematically the calibration circuit of the present invention in block diagram form FIG. 3 together with FIG. 3a shows a conventional binary rate multiplier stage and illustrates the output signals obtained for a particular decimal code FIGS. 4a, 4b and 4c taken together, show schematically a particular embodiment of the present invention and FIG. 5 shows the general operation of switch operation in a binary rate multiplier FIGS. 6 and 6a show a centrifugal chemical analyzer which can be used in combination with the calibration circuit of the present invention and FIG. 7 shows the analyzer of FIG. 6 in combination with the calibration circuit of FIG. 4.

With reference to the drawing, FIG. 1 shows schematically a block diagram arrangement for obtaining light absorbance data for a centrifugal type analyzer. In FIG. 1, a rotatable disc 1, for example suitably made of Teflon* (*Trademark of E.I. DuPont De Nemours), is shown having cavities 3 and 5 from which a liquid sample, i.e. blood serum, and a liquid reagent are caused by centrifugal force, upon rotation of rotatable disc 1, to pass into chamber 7 and mix and react in the communicating cuvette 9. A plurality of such cavity arrangements, e.g. thirty is provided around the periphery of the rotatable disc 1 and communicate respectively with a plurality of radially aligned cuvettes in an indexed ring member 21. The extent of the reaction in the cuvettes 9 is measured photometrically through the use of light source 11 and a conventional photomultiplier detector 13 which supplies a signal related to the light absorbance, i.e. the optical density of the liquid in the transparent cuvettes 9 to amplifier 15 which is conveniently a logarithmic amplifier. The amplified analog signal is transmitted to a conventional analog-to-digital converter 17, including for example a peak level detector type of device. The digital signal obtained is transmitted to conventional storage unit 19, e.g. Signetics Incorporated 2005 and 2004 shift registers connected in series, and at a desired time binary information is transferred in parallel to a conventional binary to binary coded decimal converter 21 and the signal in decimal form is transmitted to print logic unit 23, for example including standard code wheel driver circuits and solenoid driver circuits, and a printout, in terms of light absorbence units, is obtained from printer 25. Printer 25 can be a commercially available unit such as a Moduprint Mode A available from Practical Automation Inc. Ordinarily, a standard liquid of known light absorbence, i.e. optical density, is initially provided in cuvette 9 and the value obtained at printer 25 is compared with the known light absorbance of the standard. If there is a difference in value, an adjustment, i.e. calibration of the analog input signal was made, for example, by a potentiometer adjustment indicated at 27. Such an adjustment can be tedious, time consuming and dependent to more or less extent in the skill and training of the individual involved.

These difficulties are avoided in the present invention by the circuit arrangement shown in block diagram form in FIG. 2, in which the analog adjustment 27 has been eliminated and a calibration circuit added comprising cascaded binary rate multiplier stages 36, 38, 40 and 42, binary counter 30, dividing means 36, and zero recognition circuit 35. With reference to FIG. 2, binary information corresponding to the measured light absorbance of the sample in cuvette 9, initially provided by an uncalibrated analog input signal, is transferred to a conventional "count down" binary counter 30, for example, upon application of a signal from a conventional pulse generator 20. Clock pulses 32, also available from a conventional pulse generator, applied through gate 34, are divided by 10 at 36, using for example a conventional decade counter, and the resulting pulses at 38 cause binary counter 30 to count down to zero, at which time an inhibiting signal from "zero" recognition circuit 35 prevents further clock pulses 32 from reaching binary counter 30 and the counter is stopped. If the series of clock pulses which reach binary counter 30 (which correspond to the "as measured" light absorbance, or optical density, of the sample) are considered to be represented by F, then 10F, i.e. ten times as many pulses are applied to the binary rate multiplier arrangement comprising BRM No. 1, BRM No. 2, BRM No. 3 —BRM No. n indicated at 36, 38, 40 and 42 respectively. As more hereinafter more fully described, by appropriate adjustment of decimal switches No. 1, No. 2, No. 3, and No. n, indicated at 44, 46, 48 and 50, to provide factors $A_1$, $A_2$, $A_3$ and $A_n$, the 10F pulses applied at 52 can be multiplied by a factor of from 0.00 to 9.99 (and higher) and applied through BCD counter 54 to a printer. In effect this provides a multiplication of F (absorbence value) by a factor, K, of from 0.00 to 9.99 (and higher). Thus, knowing the amount by which the absorbence reading is "off" (determined for example by a previous measurement with a standard) a precise multiplication setting "K" can be made using decimal switches 44, 46, 48 etc., as hereinafter described. The calibrated value for light absorbance will then be applied to the printer concurrent with the completion of the count down of binary counter 30 to zero. Thus conversion of the uncorrected "as measured" data to a calibrated value occurs simultaneously with the counting of the uncorrected data.

With reference to FIG. 3, one stage of a binary rate multiplier is illustrated which can be considered as corresponding to BRM No. 1 stage indicated at 36 in FIGS. 2 and 4. The remaining cascaded stages BRM No. 2, BRM No. 3 — BRM No. n are identical. The BRM stage illustrated in FIG. 3 includes four "channels" 101, 201, 301, and 401, the parallel outputs of which will appear at 105 under conditions hereinafter more fully described. Channel 101 comprises a conventional inverter 69, conventional NAND gates 61 and 69 (which, by definition, will provide a negative going output pulse whenever all input signals thereto are positive) and a switch SW5, which can be either electrically or mechanically actuated to provide an appropriate signal via connector 140 to "open" NAND gate 61 (when all other signals to the gate are at appropriate levels). Channel 201 comprises a similar inverter 73, NAND gates 71 and 63, and switch SW2. Channel 301 similarly comprises inverter 77, NAND gates 75 and 65 and switch SW1′ and channel 401 comprises, NAND gate 67 and switch SW1. Gate 79 provides for the passage of a "carry" pulse to the next cascaded BRM stage (e.g. BRM No. 2) through inverter 81 when decade counter 104 has counted to a value of "9", as hereinafter described. The binary rate multiplier stage in FIG. 3 also includes a conventional decade counter 104 which is schematically illustrated in FIG. 3a. With reference to FIG. 3a decade counter 104 is shown comprising four conventional stages, e.g. four triggerable bistable multivibrators indicated at 501, 503, 505, and 507. With a signal F applied to the counter the trailing or falling edge of each pulse in F causes the counter to assume a new state or count. There are ten separate states that the counter may take (a state being a particular combination of outputs $Q_1$, $Q_2$, $Q_4$, and $Q_8$) and the counter is thus a decade counter. When the counter counts to "nine", the next F pulse is carried (to the next cascaded BRM stage) as indicated at 506. Also, in the conventional manner, the counter will at this time be re-set or "cleared" via gate 508. The time relationships of the output signals $Q_1$, $Q_2$, $Q_4$ and $Q_8$ are shown in FIG. 3.

In operation, for the particular polarity of signals indicated in the pulse-time diagram of FIG. 3, (assuming all switches SW5, SW2, SW1′ and SW1 are enabled to open gates 61, 63, 65 and 67) whenever F is "one" (or high) and when $Q_1$ is "zero" (or low) gate 61 will be "on" and an output *f*5 of five F pulses, for each ten F pulses applied, will appear at 105. (The output *f*5, etc., are actually inverted from the position shown but is shown as indicated for purposes of simplification.) Also, wherever F is "one", $Q_1$ is "one" and $Q_2$ is "zero" ("one" being applied at gate 63 via NAND gate 71), gate 63 will be "one" and an output *f*2, of two F pulses for each ten F pulses applied, will appear at 105. A positive signal at 147 applied at gate 69 when $Q_1$ is "one" indicates to the second and succeeding channels that a previous BRM stage is at a "carry" and NAND gate 70 will cause a "1" to be applied at gate 63. For the first BRM stage there is no previous stage and this indication is not essential. However for succeeding cascaded BRM stages the "carry" indication is required to provide non-coincident outputs from the cascaded stages. Likewise, wherever F is "one", $Q_1$ is "one", $Q_2$ is "one" (being inverted twice at 71 and 73) and $Q_4$ is "zero" ("one" being applied at gate 65 via NAND gate 75) gate 65 will be "on" and an output *f*1′, of one F pulse for each ten F pulses applied, will appear at 105. Also, whenever F is "one", $Q_1$ is "one", $Q_2$ is "one", $Q_4$ is "one", and $Q_8$ is "zero", gate 67 will be "on" and an output *f*1, of one F pulse for each 10F pulses applied will appear at 105. There is no need to apply the $Q_8$ output to gate 67 under these conditions since it is inherent in a decade counter that $Q_8$ is "zero" when $Q_1$, $Q_2$, and $Q_4$ are "one". As can be seen from the above description, each channel of the BRM stage will provide an output signal (with its corresponding switch enabled) whenever F is "one", the output from its corresponding counter stage is "zero" (i.e. opposite polarity), and all previous counter stage outputs (if any) are "one" (same polarity as F). Also it can be noted that the counter assumes a new state on the trailing and falling edge of each F pulse (a state being a particular signal combination of outputs $Q_1$, $Q_2$, $Q_4$ and $Q_8$). Consequently none of the outputs *f*5, *f*2, *f*1′ and *f*1 are coincident as shown in FIG. 3. The "carry" pulse, provided via inverter 81 whenever ten F pulses have been applied to counter 104, is applied to the succeeding cascaded BRM stage 38 at counter 104′ shown in FIG. 4b where the signal-time relationship of FIG. 3 is duplicated exactly, taking into account that one F pulse is applied to BRM stage 38 for each ten F pulses applied to the previous BRM stage 36. Also the "carry" pulse is applied to NAND gate 69′ of the second cascaded BRM stage 38 to indicate to the channels of that stage that the previous BRM stage is at a "carry". The same arrangement is provided for each succeeding cascaded BRM stage which assures the non-coincidence of pulse outputs from the respective BRM stages. The same circumstances apply for each succeeding cascaded BRM stage. None of the outputs of the respective cascaded BRM stages will be coincident with any other cascaded BRM stage. It can be noted that the outputs of the BRM stage illustrated in FIG. 3 are available in a decimal code of 5–2–1–1. That is, output pulses are available in any digit combination of 1 to 9 for each ten input pulses. This condition is achieved by taking advantage of the outputs inherently available in a decade counter as previously described and therefore a minimum of circuitry is required to obtain a 5–2–1–1 decimal coded output from the BRM stage.

By an appropriate combination of the outputs *f*5, *f*2, *f*1′ and *f*1 available at 105 of BRM stage 36 (or any cascaded BRM stage) i.e. by selective enablement of switches SW5, SW2, SW1′ and SW1, from 0 to 9 output pulses can be provided for each 10 input pulses. This in effect makes available a multiplication factor of 0 to 0.9 in each BRM stage. The switches SW5, etc., can be enabled manually or by mechanical, electrical or magnetic means, etc.

However, decimal switches are commercially available which can be connected to provide a multiplication factor or an (A) value corresponding to a "set" numerical value as further illustrated in FIG. 4. FIG. 5 shows schematically the general operation of an enabling switch. With SW5 in the "on" position the input to gate 61 is "high" (or one). In the "off" position the input to gate 61 via 140 is ground and the gate is "off".

With further reference to the drawing, FIG. 4, shows a particular embodiment of the present invention. In FIG. 4, a conventional binary counter is indicated at 80 comprised of twelve conventional triggerable bistable multivibrator circuits 80(a) through 80(l). Each stage, 80(a) through 80(l) will reverse its state on the falling edge of a signal applied at its input T. Usually counters are arranged to count-up. However, in the embodiment of FIG. 4, for reasons of efficiency and convenience the counter is arranged to count "down" by connecting the $\overline{Q}$ output of each stage to the T input of the succeeding stage. As a result the state or binary number sequence in the counter (from binary data received from storage unit 19) is the reverse of normal counting, i.e. 0100....0,1000...0,0000....0,1111 ....1,0111....1, etc. Binary counters of the aforedescribed type are available commercially e.g. Texas Instrument Model SN74191. In operation the binary data stored in the storage unit 19 e.g. representing a number such as "1000" in binary form is transferred in parallel to counter 80 through gates 82 upon application of a signal at 84 from a conventional gated pulse generator such as indicated generally at 20 in FIG. 2. Clock pulses are applied at 86 from a conventional pulse generator 21 also indicated in FIG. 2 through gate 87 and inverter 88 to a conventional decade counter arrangement 90 which divides the input pulses by 10 for reasons hereinafter more fully explained. This arrangement can be a commerically available Texas Instrument Model SN74160 which provides an output or carry pulse for each ten input pulses. The pulses from arrangement 90 are applied through an inverter 92 at 94 to the first stage 80(a) of counter 80. If the pulses applied at 81 are considered to be F pulses then the pulses at 96 are 10F. The pulses (F) applied at 81 cause counter 80 to count "down" until the binary data from storage unit 19 counts down to zero. At this time, all the inputs to gate 98 from counter 80 are the same or "one" and an inhibiting signal is applied via connector 100 turning "off" gate 87 and stopping counter 80. Concurrently with the counting "down" of counter 80 for F pulses (e.g. 1000 pulses), 10F pulses (10,000 pulses) were applied at 102 to decade counter 104 (e.g. Texas Instrument Model SN74160) and the NAND gate 61, 63, 65, and 67 of binary rate multiplier stage 36 (BRM No. 1). The operation of binary rate multiplier stage 36 and each succeeding cascaded BRM stage is as described previously in connection with FIG. 3. As previously mentioned in connection with FIG. 3, the output of BRM stage 36, which appears at 105 in a 5–2–1–1 decimal code, depends upon the condition of switches SW5, SW2, SW1′ and SW1. The output from BRM stage 36 can thus range from 0 to 0.9 × 10F. Whenever decade counter 104 counts to 10, a carry pulse is applied via gate 106 and inverter 108 to the decade counter 104′ in the next cascaded BRM stage 38 and to NAND gates 61′, 63′, 65′ and 67′. Thus F (e.g. 1000) pulses are applied to BRM stage 38 for every 10F (1000) pulses applied to BRM stage 36. In a similar manner 1/10F (e.g. 100) pulses are applied through gate 112 and inverter 114 to decade counter 104″ in the next cascaded BRM stage 40 and to NAND gates 61″, 63″, 65″ and 67″. Thus, at location 105, depending on the condition of the switches SW5—SW1 of the respective BRM stages 36, 38 and 40, the following outputs, which are not coincident, can be obtained:

0 to 0.9 × 10F — or $A_1$ × 10F
0 to 0.9 × F — or $A_2$ × F
0 to 0.9 × 1/10F – or $A_3$ × F/10

The output pulses at 105 are applied to binary coded decimal counter arrangement 54, comprising "unit" counter 120, "tens" counter 122, "hundreds" counter 124 and "thousands" counter 126. Each counter 120, 122, 124 and 126 can be a decade counter identical to decade counter 104, 104′ etc. When these counters 120, 122, 124, 126 have completed the "count up" of the pulses received from BRM 36, 38 and 40, the respective $Q_1$, $Q_2$, $Q_4$, $Q_8$ signals are applied to the associated conventional driver logic 23 which operates conventional printer unit 25, in a well known manner to provide a decimal readout.

By way of a specific example, if the uncorrected value in the storage unit 19 corresponds to 1000 (e.g. light absorbance units) then after 1000 (F) pulses are applied at 81 to counter 80, the counter 80 will have "counted down" to zero and the pulses will be inhibited. Concurrently 10000 pulses (10F) were applied at 102. If having determined that the overall calibration factor, K, should be 0.50 (i.e. the correct value for light absorbance units should be "500", the switches of BRM's 36, 38 and 40 are adjusted as follows:

1. switches SW5, SW2, SW1′ and SW1 of BRM 36 are all "off" i.e. providing a ground connection at inputs 140, 142, 144 and 146, illustrated by example for the first stage of BRM 36 in FIG. 5, thus no output appears at 105 from BRM 36
2. switch SW5 of BRM 38 is "on", switches SW2, SW1′ and SW1 of BRM are "off", thus 5 pulses from BRM 38 appear at 105 for ten pulses delivered through inverter 108. That is 0.5F pulses appear at 105
3. switches SW5, SW2, SW1′ and SW1 of BRM 40 are "off". Thus no output appears at 105 from BRM 40.

In practice, the desired adjustment of switches SW5 etc., in the respective BRMs is accomplished using a commercial decimal switch such as a Series 200 Type 214 Miniswitch* (*Trademark of the Digitran Company) available from the Digitran Company and indicated schematically at 44, 47, 49 and 51. The factor (A) for each BRM is provided by adjusting dials 47, 49 and 51 with the "thumb-wheels" 53, 55 and 57 to read the desired (A) value directly. Appropriate mechanical linkage 61, 63 and 65 then provides the proper switch positioning for SW5 etc. Thus for the specific example described, dial 47 is set to "0", dial 49 is set to "5" and dial 51 is set to "0". With the above example, the pulses applied to BCD counter 54 i.e. 0.5F (or 500) provide a decimal coded output of 0.5F (or 500) in the "hundreds" unit of BCD counter 54. The "corrected" or calibrated value of "500" will thus be printed by printer 25. In a similar manner, for the example given, any calibrated value from zero to 9,990 can be provided. To provide further precision of calibration, additional cascaded BRM stages can be provided as shown at 42. This addition of one additional stage will permit an (A) of 0 to 0.9 to be applied to (1/100)F pulses thus permitting the calibration factor to extend to "thousandths". Additional stages will permit calibration to "ten thousandths" etc. With the arrangement shown in FIG. 4a the F pulses can be multiplied by from 0. to 99.99 (and higher) by adding additional pulse dividing means as shown at 150 in FIG. 4. The addition of further dividing means in series with dividing means 90 will each provide a further increase in the multiplication factor by a factor of 10. While the present invention has been described in connection with circuitry to provide a 5–2–1–1 decimal coded output from cascaded binary rate multiplier stages, the BRM circuitry can be designed to provide other decimal coded outputs such as 8–4–2–1. This provides the required combination of digits of 1 to 9 (and more) while requiring more than the minimal circuitry used with a 5–2–1–1 decimal coded output. Such BRMs which provide a 8–4–2–1 coded output are commercially available e.g. Texas Instrument SN74167.

A further embodiment of the present invention is represented in FIG. 7 for use in connection with the analyzer shown in FIGS. 6 and 6*a*. The analyzer shown in FIG. 6, of the type previously mentioned, comprises a rotatable loading disc 1 containing 30 rows of cavities indicated at 302, each row having a serum cavity 3, a reagent cavity 5, and a mixing chamber 7. Each row of cavities 302 is respectively aligned with a cuvette 9 in rotor assembly 304. When the rotor is driven, serum and reagent are transferred through channels 306 to the respective cuvettes 9. The filled cuvettes 9 rotate rapidly between light source 11 and a conventional photomultiplier unit 13, e.g. at 1000 RPM and provide electrical signals in the form of pulses to a conventional amplifier, e.g. a logarithmic amplifier 308. The signals applied to the amplifier 308 are in the form of pulses due to the chopping effect of the rotor assembly 35. A logarithmic amplifier is desirable due to the inherent logarithmic character of the absorbance phenomenon of serum-reagent reactions. The amplitude of the pulses applied to the amplifier 308, and the amplified pulses are a measure of the state of reaction in the cuvettes 9. The voltage pulses from amplifier 308 are applied to a conventional peak detector 310, which can be a Peak Detector Module 4084/25 available from the Burr-Brown Research Corporation. The peak detector 310 observes the peak value of each pulse applied and transmits this value to analog to digital converter 312 which can be a Teledyne Philbrick Nexus Model 4103 which converts the peak signals received to a group of pulses in the conventional binary number system representing the light absorbance in cuvettes 9. The pulses from analog to digital converter 312 are conventionally transferred to a storage, or memory unit 19. The pulses are then transferred at a desired time to binary counter 30 shown within the dotted enclosure 314. The arrangement within enclosure 314 corresponds to the calibration circuit shown in FIG. 2 in accordance with the present invention and more fully described in connection with FIG. 4. The operation of the calibration circuit 314 is the same as that previously described and provides a calibrated output for the light absorbance in cuvettes 9.

The aforedescribed analyzer is of the type described in "Analytical Biochemistry", 28, 545–562 (1969).

A frequently performed analytical test using centrifugal analyzers is the determination of glucose blood serum. In this analysis, five microliters of serum is placed in the serum cavities and 350 microliters of glucose reagent is placed in the reagent cavities of sample disc 1. The glucose reagent is a 0.3 molar triethanolamine buffer of pH 7.5 containing 0.0004 Mol/liter NADP, 0.0005 Mol/liter ATP, 70 mg/liter hexokinase, 140 mg/liter glucose–6–phosphate dehydrogenase and 0.004 mol/liter $MgSO_4$. The combined action of ATP (adenosine triphosphate) and NADP (nicotineamide adenine dinucleotide phosphate) in the presence of the enzymes hexokinase and glucose–6 phosphate dehydrogenase leads to the reduction of NADP which is followed spectrophotometrically by detecting changes in absorbance at a wavelength of 340nm.

I claim:

1. A calibration circuit comprising a binary counter means adapted to receive binary data; pulse means for providing a series of electrical pulses adapted to cause the binary counter means to count binary data applied thereto; pulse dividing means for receiving the pulses provided by the pulse means and for applying $1/10^n$ of the received pulses to the binary counter means, where n is a whole number equal to one or more; a plurality of cascaded binary rate multiplier means each including a plurality of gated channels and a decade counter with each of the successive channels being connected to each of the successive stages of the decade counter; means for applying pulses from the pulse means to each channel of the first binary rate multiplier stage and the decade counter of the first binary rate multiplier means, each channel of each binary rate multiplier means being adapted to provide an output signal when the pulse signal applied thereto and the output of all previous counter stages, if any, are of the same polarity and the output signal of the decade counter stage connected thereto is of the opposite polarity and upon the application thereto of an additional enabling signal; means for applying the carry output of each decade counter to the decade counter of the next cascaded binary rate multiplier means and each of the gated channels thereof; means for selectively providing individual enabling signals at each of the channels of each binary rate means whereby output pulses are passed through said channels to provide serial output pulses in combination of one to nine depending on the selection of the enabling signals; means for inhibiting the application of pulses to the binary counter means and the binary rate multiplier means when the data applied to the binary counter means has been counted; and second decade counter means arranged to receive the output pulses from each channel of each binary rate multiplier means, the stages of the second decade counter means providing a binary coded decimal output signal corresponding to the total pulses received from the binary rate multiplier means.

2. An apparatus for providing a calibrated digital output electrical signal corresponding to an input analog electrical signal corresponding to the light absorbance of liquid medium which comprises, in combination, a light source; photodetector means spaced from and arranged in juxtaposition therewith, said photodetector means providing an analog electrical signal proportional to the light absorbance of the medium by which it is separated from said light source; a rotatably moveable rotor means arranged to have a peripheral portion thereof rotate between said light source and said photodetector means, said photo-detector means having a plurality of light transmitting sample analysis chambers located at a common radial position in said rotor means and arranged to pass between said light source and said photodetector means whereby an analog electrical signal provided by the photodetector means proportional to the light absorbance of the contents of an analysis chamber; means for converting the analog electrical signal to digital binary data; binary counter means arranged to receive said binary data; pulse means for providing a series of electrical pulses adapted to cause the binary counter means to count binary data applied thereto; pulse dividing means for receiving the pulses provided by the pulse means and for applying $1/10^n$ of the received pulses to the binary counter means, where n is a whole number equal to one or more; a plurality of cascaded binary rate multiplier means each including a plurality of gated channels and a decade counter with each of the successive channels being connected to each of the successive stages of the decade counter; means for applying pulses from the pulse means to each channel of the first binary rate multiplier stage and the decade counter of the first binary rate multiplier means being adapted to provide an output signal when the pulse signal applied thereto and all previous counter stages, if any, are of the same polarity and the output signal of the decade counter stage connected thereto is of the opposite polarity and upon application thereto of an additional enabling signal, means for applying the carry output of each decade counter to the decade counter of the next cascaded binary rate multiplier means and end of the gated channels thereof; means for selectively providing enabling signals at each of the channels of each binary rate means whereby output pulses are passed through said channels to provide serial output pulses in combination of one to nine depending on the selection of the enabling signals; means for inhibiting the application of pulses to the binary counter means and the binary rate multiplier means when the data applied to the binary counter means has been counted; and second decade counter means arranged to receive the output pulses from each channel of each binary rate multiplier means, the stages of the second decade counter means providing a binary coded decimal output signal corresponding to the total pulses received from the binary rate multiplier means; printer means adapted and arranged to receive said binary coded decimal signals and provide a display corresponding to said binary coded decimal signals.

* * * * *